(12) United States Patent
Heyers et al.

(10) Patent No.: US 6,825,057 B1
(45) Date of Patent: Nov. 30, 2004

(54) THERMAL MEMBRANE SENSOR AND METHOD FOR THE PRODUCTION THEREOF

(75) Inventors: Klaus Heyers, Reutlingen (DE); Wilhelm Frey, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/355,373

(22) PCT Filed: Nov. 23, 1998

(86) PCT No.: PCT/DE98/03444
§ 371 (c)(1),
(2), (4) Date: Oct. 25, 1999

(87) PCT Pub. No.: WO99/27325
PCT Pub. Date: Jun. 3, 1999

(30) Foreign Application Priority Data

Nov. 25, 1997 (DE) .......................... 197 52 208

(51) Int. Cl.[7] .............................................. H01L 21/00
(52) U.S. Cl. ................... 438/54; 438/411; 438/705
(58) Field of Search ........................ 438/54, 411, 421, 438/466, 705, 931, 977, FOR 330, FOR 485, 960; 257/467, 522

(56) References Cited

U.S. PATENT DOCUMENTS

| | | | | |
|---|---|---|---|---|
| 3,576,996 A | * | 5/1971 | Stevens ...................... 250/352 |
| 4,622,856 A | | 11/1986 | Binder et al. |
| 4,665,276 A | * | 5/1987 | Elbel et al. .................. 136/214 |
| 4,779,994 A | * | 10/1988 | Diller et al. ................. 136/225 |
| 4,945,240 A | * | 7/1990 | Nix et al. .................... 250/330 |
| 5,242,863 A | * | 9/1993 | Xiang-Zheng et al. .... 148/DIG. 128 |
| 5,354,695 A | * | 10/1994 | Leedy ................ 148/DIG. 135 |
| 5,589,688 A | * | 12/1996 | Kimura et al. ........... 250/338.4 |
| 5,629,790 A | | 5/1997 | Neukermans et al. |
| 5,682,053 A | * | 10/1997 | Wiszniewski ................ 257/401 |
| 5,813,764 A | * | 9/1998 | Visser et al. ................... 374/12 |
| 5,830,372 A | * | 11/1998 | Hierold .......................... 216/2 |
| 5,944,970 A | * | 8/1999 | Rosenblatt ................... 204/416 |
| 5,968,678 A | * | 10/1999 | Tanase et al. ............. 369/13.41 |
| 6,012,336 A | * | 1/2000 | Eaton et al. ................... 73/754 |
| 6,100,107 A | * | 8/2000 | Lei et al. ..................... 438/456 |
| 6,103,023 A | * | 8/2000 | Cyrot-Lackmann et al. ..... 106/286.2 |
| 6,133,572 A | * | 10/2000 | Cunningham .......... 250/339.03 |
| 6,197,655 B1 | * | 3/2001 | Montanini et al. ........... 438/411 |
| 6,326,229 B1 | * | 12/2001 | Mastromatteo et al. ...... 257/225 |

FOREIGN PATENT DOCUMENTS

WO    WO 95 19 563    7/1995

* cited by examiner

Primary Examiner—George Fourson
Assistant Examiner—F L. Toledo
(74) Attorney, Agent, or Firm—Kenyon & Kenyon

(57) ABSTRACT

A process for manufacturing a membrane sensor over a silicon substrate, preferably a thermal membrane sensor. A thin layer of silicon carbide or silicon nitride is deposited over an area of porous silicon formed in the surface of the substrate, and then openings that extend as far as the layer of porous silicon are formed in the silicon carbide or silicon nitride layer via a dry etching process. Next, semiconductor structures and conductor path structures are implanted into the upper surface of the membrane layer via lithographic steps, and then the sacrificial layer of porous silicon is removed using a suitable solvent such as ammonia. Thus an empty space that thermally isolates the sensor membrane from the substrate is created beneath the membrane layer.

15 Claims, 1 Drawing Sheet

THERMAL MEMBRANE SENSOR AND METHOD FOR THE PRODUCTION THEREOF

BACKGROUND INFORMATION

The invention relates to a process for manufacturing a thermal membrane sensor over a silicon substrate according to the preamble to Patent claim 1, and to membrane sensors manufactured via this process. A process of this kind and a membrane sensor and a process for its manufacture are described in ITG-Fachbericht 126: Sensoren-Technologie und Anwendung [Technical Report 126: Sensor technology and applications], pp. 285–289.

Thin, preferably silicon layers which are deposited over a silicon substrate and beneath which there is an empty space that maintains separation and which thus function as a membrane are used in a variety of technical applications. One application for membrane components of this kind is in sensors, preferably thermal membrane sensors that detect physical values, e.g., mass flow, by detecting temperature changes in the thin membrane layer.

In thermal sensors of this kind, the thin membrane layer must be thermally isolated from the substrate as effectively as possible. In conventional technologies for manufacturing flow sensors or radiation detectors, a thin membrane is produced as the sensor carrier via an anisotropic etching process on the rear side of a silicon wafer. Dual-side lithography is used for purposes of masking, but it requires greater expenditure on equipment. In addition, the deep etching grooves throughout the wafer constitute mechanical weak points, and one must be careful not to break the wafer plate during subsequent processing. As etching stop planes extend at a slant in the crystal, openings on the rear side are larger than on the front side. As a result, a significantly greater wafer area per sensor is required. In addition, the use of complex metal layer packets and insulators on the silicon membrane can cause major problems in terms of drifting of layers and long-term stability, e.g., if layers detach from one another.

The aforementioned ITG-Fachbericht 126 avoids this problem by using porous silicon technology. This process involves the following steps:

I Create an etching mask on one main surface of the substrate that leaves an area on the silicon substrate where the membrane is to be created exposed;
II Electrochemically etch the exposed substrate area to a specific depth, thus forming porous silicon within the exposed area;
III Remove the mask;
IV Deposit a thin membrane layer of silicon carbide or silicon nitride;
V In preassigned areas of the silicon carbide or silicon nitride membrane layer, create openings inwards from the upper surface;
VI Selectively create circuit structures on the upper surface of the membrane layer and;
VII Remove the layer of porous silicon below the membrane layer via sacrificial layer etchings.

However, in the prior-art thermal membrane sensor, the circuit structures are created via sputter deposition of metal atoms onto the upper surface of the membrane, which means that they are susceptible to external mechanical and chemical influences.

SUMMARY OF THE INVENTION

In view of the above, an object of the present invention is to provide a process for manufacturing a thermal membrane sensor using porous silicon technology and a thermal membrane sensor manufactured via this process for detecting mass flow in which the circuit structure of the thermal membrane sensor can be manufactured using surface micromechanical processes so that substantial separation is maintained between the active area and the substrate and the circuit elements are largely protected against external mechanical and chemical influences.

According to the present invention in Step VI the circuit structures are implanted into the invention upper surface of the membrane layer.

Thus by using porous silicon technology one can inexpensively and quickly create a silicon carbide or silicon nitride membrane over the silicon substrate and then, according to the present invention, create a thermoresistive or thermoelectric sensor via masked doping in such a way that its circuit structures are largely protected against external mechanical and chemical influences.

The process according to the present invention is suitable for manufacturing not just thermal membrane sensors but also any type of thin element that uses exposed membranes positioned over a silicon substrate, e.g., actuators that contain a membrane that can be displaced by pressure or vacuum. Membrane thickness of between several tens to several hundred nm can be achieved with this process.

The porous silicon layer in the silicon substrate is preferably formed via an electrochemical anodizing process in a hydrofluoric acid electrolyte. The silicon carbide or silicon nitride layer deposited on it is preferably created via a low-temperature LPCVD or low-temperature PECVD process. Alternatively, a thin layer of this kind can also be deposited via a reactive sputter deposition process. Note that a silicon carbide layer is preferable, as it is mechanically stronger and chemically more resistant. In subsequent lithographic structuring, the openings in the silicon carbide or silicon nitride layer are preferably created via a dry etching process, e.g., in a plasma etcher. In a further lithographic step, the desired conductor paths for the thermoresistive elements (heater and sensor) are defined and created via at least one implantation step. The conductor paths are made of aluminum, for example.

In this way, one can create the thermoresistive unit directly in the upper surface of the membrane via surface micromechanics with no problem-prone interlayer, so that the thermal sensor is CMOS-compatible and is not susceptible to external chemical and mechanical influences.

Alternatively, instead of creating a thermal membrane sensor in which the measuring signal is generated by thermosresistive measuring elements, one can use the process of the present invention to manufacture a thermal membrane sensor that makes use of thermoelectric effects, as follows: A thermopile made of two different substances having a strong Seebeck effect, e.g., antimony bismuth or silicon aluminum, is implanted into the upper surface of the membrane. After a further lithographic process, additional implantation is carried out.

To provide additional protection against dirt that can cause the sensor to malfunction, a thin silicon carbide or silicon nitride protective layer may be applied over the entire surface.

In addition, the manufacturing process of the present invention may be used to manufacture a thermal membrane sensor used as a radiation sensor (bolometer). For this purpose, an additional absorption layer is applied, for example black gold or black silicon. Black gold displays excellent broadband absorption of about 98% and is created by thermally vaporizing gold in a low pressure nitrogen atmosphere. Black silicon is created, for example, in a plasma etcher via an appropriately controlled process following deposition.

Finally, one uses a suitable solvent, e.g., ammonia, to remove the porous silicon that has until now served as the support material and substrate for the thin membrane layer. The sensor membrane is thereby exposed and thus thermally isolated from the substrate. Note that porous silicon has a much greater surface area than the educt. The surface area of nanoporous silicon is about $10^6$ times greater than that of bulk silicon.

Using the process of the invention described above, one can manufacture a thermal sensor which is CMOS-compatible in terms of its surface micromechanics and whose active area is at a substantial distance from the substrate thanks to the porous silicon technology used and is thus largely thermally isolated from the substrate. The carrier material of the membrane, preferably silicon carbide, is chemically and mechanically highly resistant.

Thanks to the very simple sequence of process steps and the low wafer surface removal compared to conventional structuring steps (e.g., involving KOH), a thermal membrane sensor can be manufactured very inexpensively. All process steps are widely available in the semiconductor manufacturing industry.

BRIEF DESCRIPTION OF THE DRAWINGS

FIG. 1A shows process Steps I and II, in which an etching mask 3 in the form of a photosensitive resist is applied to the upper surface of an appropriately pretreated substrate block 1, exposed to light in the area where the membrane is to be created and then removed (Step I). The masked substrate 1 is then locally etched via electrochemical anodizing in a hydrofluoric acid electrolyte so that it is porous down to a specified level, so that a layer of porous silicon is formed (step II).

FIG. 1B shows the following: After mask 3 is removed, a thin membrane layer 4 of silicon carbide or silicon nitride, preferably silicon carbide, is deposited over porous silicon layer 2 either via a low-temperature LPCVD or low-temperature PECVD process or via a reactive sputter deposition process (Steps III and IV).

Figure 1A:
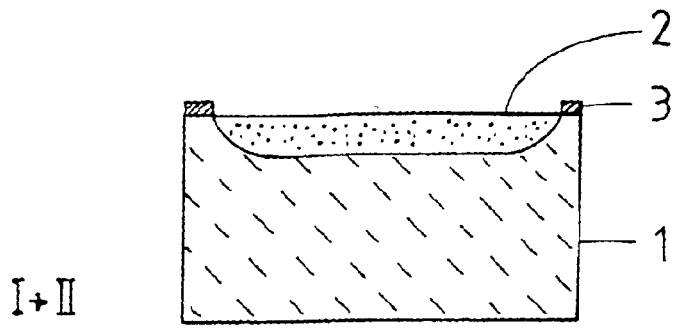
FIG. 1A illustrates a first part of the process steps of a preferred exemplary embodiment of the present invention in the form of a schematic cross section through an area of a wafer in which a thermal membrane sensor is being created.
Figure 1B:
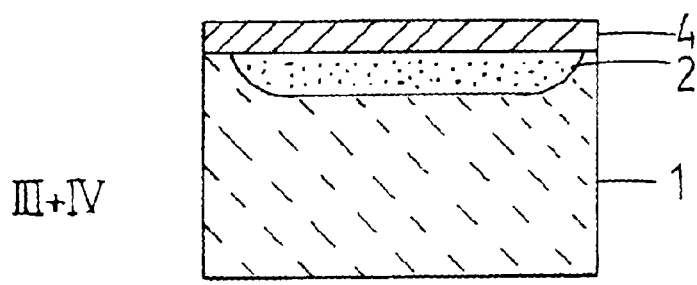
FIG. 1B illustrates a second part of the process steps of the preferred exemplary embodiment of the present invention.
Figure 1C:
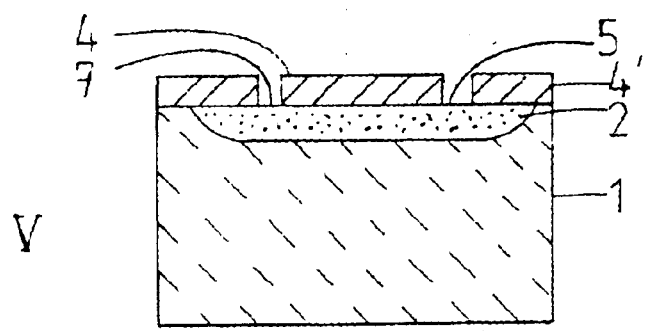
FIG. 1C illustrates a third part of the process steps of the preferred exemplary embodiment of the present invention.

Next, as FIG. 1C shows, the upper surface of thin membrane layer 4 is lithographically structured and openings are created in membrane layer 4 via a dry etching process, e.g., in a plasma etcher, thus creating openings 5, 7 which extend through the membrane layer 4 as far as the layer of porous silicon 2 (Step V). The membrane, the middle area of layer 4 shown in FIG. 1C, is of course connected to the peripheral area 4' of the membrane layer via bridges.

Figure 1D:
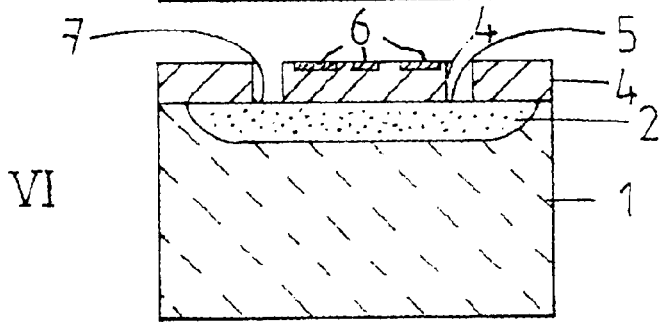
FIG. 1D illustrates a fourth part of the process steps of the preferred exemplary embodiment of the present invention.

As shown in FIG. 1D, the desired semiconductor and conductor structures and paths for the thermoresistive elements, preferably a heater and a sensor, are defined via a further lithographic step and implanted into the upper surface of membrane layer 4 via an implantation step (Step IV). Aluminum is preferable for implantation of conductor paths. Of course one can also create thermoresistive elements in the form of a thermopile by implanting two different substances having a strong Seebeck effect into the upper surface of membrane 4. Examples of such substances are antimony/bismuth and silicon/aluminum. Following a further lithographic step, additional implantation is carried out.

Next, if necessary one may apply an additional thin protective layer 9 of silicon carbide or silicon nitride over the entire surface to protect against dirt that may cause the sensor to malfunction.

Figure 1E:
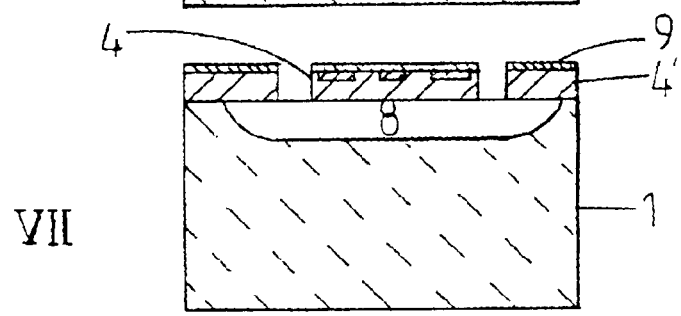
FIG. 1E illustrates a fifth part of the process steps of the preferred exemplary embodiment of the present invention.

If the thermal membrane sensor is to be used as a radiation detector (bolometer), an additional absorber layer (not shown in the figure), e.g., black gold, is applied. In the next process Step VII, the sacrificial layer 2 of porous silicon is removed using a suitable solvent such as ammonia, as show in FIG. 1E. This exposes sensor membrane 4, and the empty space created beneath ensures that the membrane and the thermoresistive elements 6 of the substrate 1 are thermally isolated.

What is claimed is:

1. A process for manufacturing an exposed membrane over a silicon substrate, comprising the steps of:

creating an etching mask on a main surface of the substrate that leaves an area of the silicon substrate where the membrane is to be created exposed;

electrochemically etching the exposed area of the silicon substrate to a preselected depth to form a layer of porous silicon within the exposed area;

removing the etching mask;

after performing the step of electrochemically etching, depositing on the layer of porous silicon within the exposed area a membrane layer composed of at least one of silicon carbide and silicon nitride;

creating openings inward from an upper surface of the membrane layer in preassigned areas of the membrane layer;

selectively creating circuit structures on the upper surface of the membrane layer, the selective creating step including the step of implanting the circuit structures into the upper surface of the membrane layer, wherein the selectively creating step includes creating conductor paths made of aluminum for the circuit structures into the upper surface of the membrane layer; and removing the layer of porous silicon below the membrane layer by sacrificial layer etching.

2. The process according to claim 1, wherein the exposed membrane is manufactured for a thermal membrane sensor.

3. The process according to claim 1, wherein the electrochemical etching step includes an electrochemical anodizing process in a hydrofluoric acid electrolyte.

4. A process for manufacturing an exposed membrane over a silicon substrate, comprising the steps of:

creating an etching mask on a main surface of the substrate that leaves an area of the silicon substrate where the membrane is to be created exposed;

electrochemically etching the exposed area of the silicon substrate to a preselected depth to form a layer of porous silicon within the exposed area;

removing the etching mask;

depositing a membrane layer composed of at least one of silicon carbide and silicon nitride;

creating openings inward from an upper surface of the membrane layer in preassigned areas of the membrane layer;

selectively creating circuit structures on the upper surface of the membrane layer, the selective creating step including the step of implanting the circuit structures into the upper surface of the membrane layer, wherein the selectively creating step includes creating conductor paths made of aluminum for the circuit structures into the upper surface of the membrane layer; and removing the layer of porous silicon below the membrane layer by sacrificial layer etching wherein the depositing step includes at least one of a low-temperature LPCVD process and a low-temperature PECVD process.

5. The process according to claim 1, wherein the membrane layer is deposited via a reactive sputter deposition.

6. The process according to claim 1, wherein the openings in the membrane layer are created via a dry etching process.

7. The process according to claim 6, wherein the dry etching process is carried out via a plasma etching.

8. The process according to claim 1, wherein the circuit structures include semiconductor elements.

9. The process according to claim 1, wherein the sacrificial layer etching is carried out using at least one of ammonia, KOH and tetramethylammonium hydroxide.

10. The process according to claim 1, further comprising the step of applying a protective layer over the entire upper surface of the membrane layer.

11. The process according to claim 10, wherein the protective layer is composed of at least one of silicon carbide and silicon nitride.

12. A thermal membrane sensor manufactured in accordance with the process of claim 1.

13. The thermal membrane sensor according to claim 12, wherein the circuit structures have a thermopile made of two different substances having a Seebeck effect.

14. The thermal membrane sensor according to claim 12, wherein the thermal membrane sensor is a radiation sensor having an additional absorber layer over a protective layer covering an entire surface.

15. The thermal membrane sensor according to claim 14, wherein the additional absorber layer is composed of at least one of black gold and black silicon.

* * * * *

UNITED STATES PATENT AND TRADEMARK OFFICE
CERTIFICATE OF CORRECTION

PATENT NO. : 6,825,057 B1
DATED : November 30, 2004
INVENTOR(S) : Klaus Heyers et al.

It is certified that error appears in the above-identified patent and that said Letters Patent is hereby corrected as shown below:

Column 1,
Line 56, change "of the membrane layer and;" to -- of the membrane layer; and --.

Column 2,
Line 10, change "the invention upper surface" to -- the upper surface --.

Column 3,
Line 13, change "of the invention" to -- of the present invention --.
Line 42, insert -- DETAILED DESCRIPTION --.

Signed and Sealed this

Eighteenth Day of October, 2005

JON W. DUDAS
*Director of the United States Patent and Trademark Office*